(12) United States Patent
Battle et al.

(10) Patent No.: US 10,996,995 B2
(45) Date of Patent: May 4, 2021

(54) SAVING AND RESTORING A TRANSACTION MEMORY STATE

(71) Applicant: International Business Machines Corporation, Armonk, NY (US)

(72) Inventors: Steven J. Battle, Austin, TX (US); Dung Q. Nguyen, Austin, TX (US); Hung Q. Le, Austin, TX (US); James W. Bishop, Newark Valley, NY (US); Brian W. Thompto, Austin, TX (US); Susan E. Eisen, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 84 days.

(21) Appl. No.: 16/360,920

(22) Filed: Mar. 21, 2019

(65) Prior Publication Data
US 2020/0301758 A1 Sep. 24, 2020

(51) Int. Cl.
*G06F 9/48* (2006.01)
*G06F 9/46* (2006.01)
*G06F 9/52* (2006.01)

(52) U.S. Cl.
CPC ............. *G06F 9/528* (2013.01); *G06F 9/467* (2013.01); *G06F 9/4812* (2013.01)

(58) Field of Classification Search
None
See application file for complete search history.

(56) References Cited

U.S. PATENT DOCUMENTS

| 9,971,713 | B2 | 5/2018 | Asaad et al. | |
| 2016/0004556 | A1* | 1/2016 | Busaba | G06F 9/467 718/101 |
| 2017/0109168 | A1* | 4/2017 | Ayub | G06F 9/3863 |
| 2018/0336037 | A1* | 11/2018 | Barrick | G06F 9/30098 |
| 2019/0004851 | A1* | 1/2019 | Doshi | G06F 9/466 |

OTHER PUBLICATIONS

Moir et al, "The Adaptive Transactional Memory Test Platform: A Tool for Experimenting with Transactional Code for Rock," Sun Microsystems, Inc., 2007, 10 pages.
(Continued)

*Primary Examiner* — Isaac T Tecklu
(74) *Attorney, Agent, or Firm* — Patterson + Sheridan, LLP (57) ABSTRACT

A processor configured to manage a transaction memory (TM) state. The processor is configured to receive a first instruction indicating a start of a speculative transaction and update a register file with a speculative transaction memory (TM) state corresponding to the speculative transaction. The processor is further configured to determine whether or not the register file is able to store the entirety of speculative TM state. If the register file is unable to store the entirety of the speculative TM state, the processor is configured to copy a previous TM (pre-TM) state from the register file to a memory which is external to the processor. Further, the processor may be configured to complete updating the register file with the speculative TM state after the pre-TM state has been copied from the register file to the memory.

20 Claims, 8 Drawing Sheets

(56) References Cited

OTHER PUBLICATIONS

Austen McDonald, "Architectures for Transactional Memory," A Dissertation Submitted to the Department of Computer Science and the Committee on Graduate Studies of Stanford University in Partial Fulfillment of the Requirements for the Degree of Doctor of Philosophy, Jun. 2009, 161 pages.

Authors et al.: Disclosed Anonymously, "A System Method for Maintaining in Memory Data Objects with No Loss of Data Availability," IP.com No. IPCOM000226975D | IP.com Electronic Publication Date: Apr. 29, 2013 | 7 pages.

Authors et al.: Disclosed Anonymously, "A novel squash & recovery mechanism in transactional memory system," IP.com No. IPCOM000196579D | IP.com Electronic Publication Date: Jun. 7, 2010 | 3 pages.

* cited by examiner

SAVING AND RESTORING A TRANSACTION MEMORY STATE

BACKGROUND

Field

Embodiments described herein disclose storing a transactional memory state of a processor in an external memory.

Description of the Related Art

Processing units commonly store speculative a transactional memory (TM) state in temporary registers while determining whether or not the corresponding transaction has passed. A previous TM (pre-TM) state is also stored within the temporary registers. Further, as the pre-TM state may need to be reloaded if the transaction corresponding to the speculative TM state fails, the pre-TM state cannot be simply deleted. However, as the pre-TM state is stored within the temporary registers, there may not be enough available temporary registers to store the speculative TM state. Thus, the processing unit may fail the transaction corresponding to the speculative TM memory state, and the processing unit may experience a reduction in performance.

SUMMARY

In one embodiment, a method for storing a speculative transaction memory (TM) state within a register file (RF) of a processor comprises receiving a first instruction indicating a start of a speculative transaction, begin updating the RF with a speculative TM state corresponding to the speculative transaction, determining that the RF is unable to store the speculative TM state, copying a pre-TM state from the RF to a memory external to the processor, and complete updating the RF with the speculative TM state.

In one embodiment, a processor is communicatively coupled with a memory. The processor comprises an RF comprising a plurality of registers, a logic unit configured to generate an instruction indicating a start of a speculative transaction, and a history buffer unit. The history buffer unit is configured to begin updating the RF with a speculative TM state in response to the instruction, determine that the RF is unable to store the speculative TM state, copy a pre-TM state from the RF to the memory, and complete updating the RF with the speculative TM state. The speculative TM state corresponds to the speculative transaction In one embodiment, a system comprises a memory and a processor communicatively coupled with the memory. The processor comprises a RF comprising a plurality of registers, and the processor is configured to begin updating the RF with a speculative TM state in response to an instruction, determine that the RF is unable to store the speculative TM state, copy a pre-TM state from the RF to the memory, and complete updating the RF with the speculative TM state. The speculative TM state corresponds to the speculative transaction.

DETAILED DESCRIPTION

Embodiments presented herein describe a processing unit having reduced failures of speculative transactions by controlling the transaction memory (TM) state stored within the registers of the processing unit. In various embodiments, a speculative TM state is stored in temporary registers. However, as the previous TM (pre-TM) state is also stored within the temporary registers, the temporary registers may not be able to store all of the speculative TM state, resulting in a failure of the corresponding transaction. Moving the pre-TM state to a memory external to the processor, increases the number of temporary registers available to store the speculative TM state, reducing failures of the corresponding transaction and increasing performance of the processor.

Figure 1:
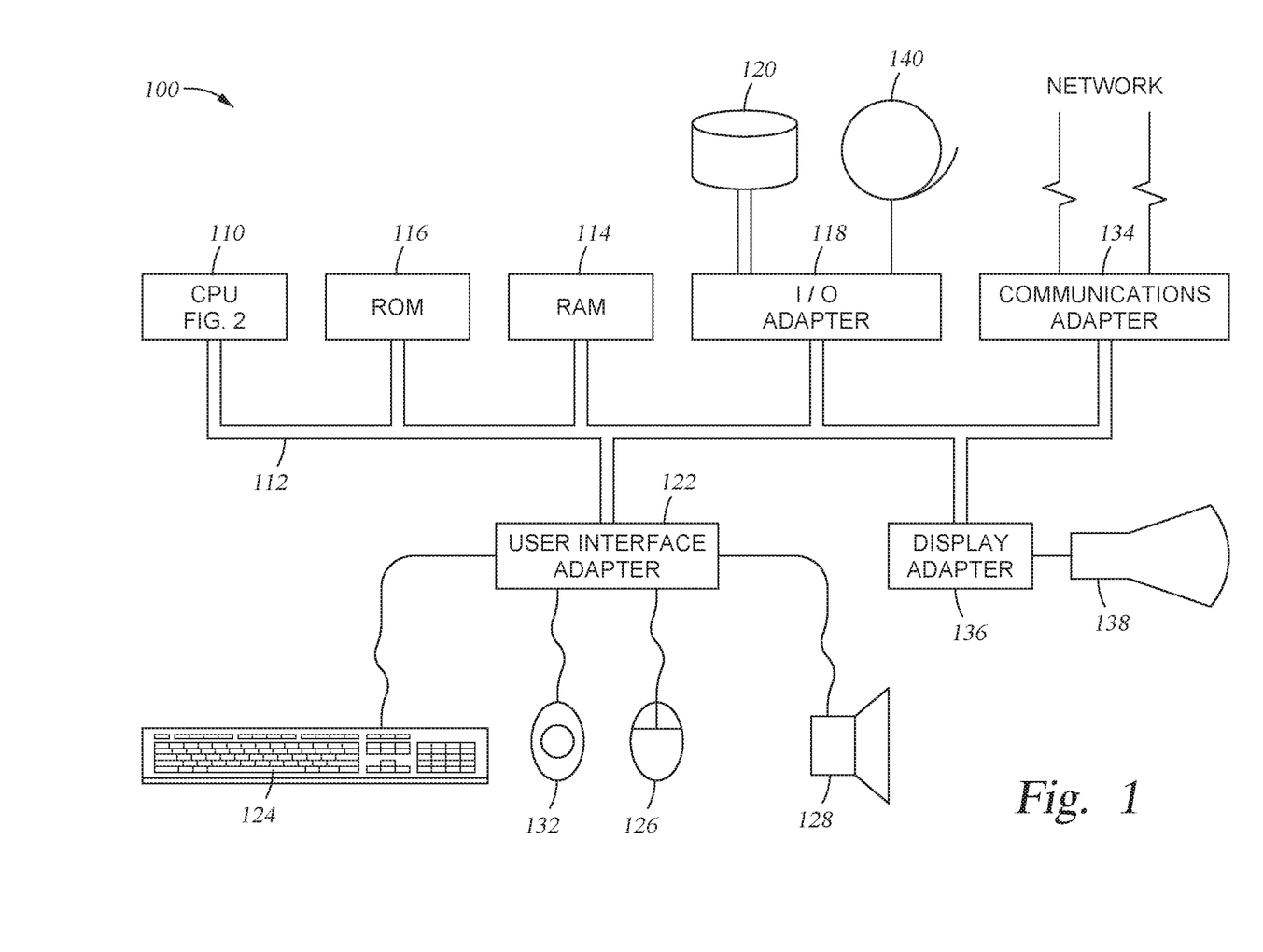
FIG. 1 illustrates an example of a data processing system, according to one embodiment.

FIG. 1 illustrates an example of a data processing system 100, according to one or more embodiments. The system has a central processing unit (CPU), or processor 110 such as a PowerPC microprocessor ("PowerPC" is a trademark of IBM Corporation). The processor 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects system bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as AIX ("AIX" is a trademark of the IBM Corporation) is used to coordinate the functions of the various components shown in FIG. 1.

The processor 110 includes various registers, buffers, memories, and other units formed by integrated circuitry, and may operate according to reduced instruction set computing ("RISC") techniques. The processor 110 processes according to processor cycles, synchronized, in some aspects, to an internal clock (not shown).

The processor 110 may store a TM state within the registers of the processor 110, and track the TM state stored within the registers. Further, the processor 110 may move entries corresponding to a TM state stored within the registers to an external memory (e.g., the memory 114 and/or 116) and update the registers with new (or speculative) TM state corresponding to a speculative transaction.

Figure 2A:
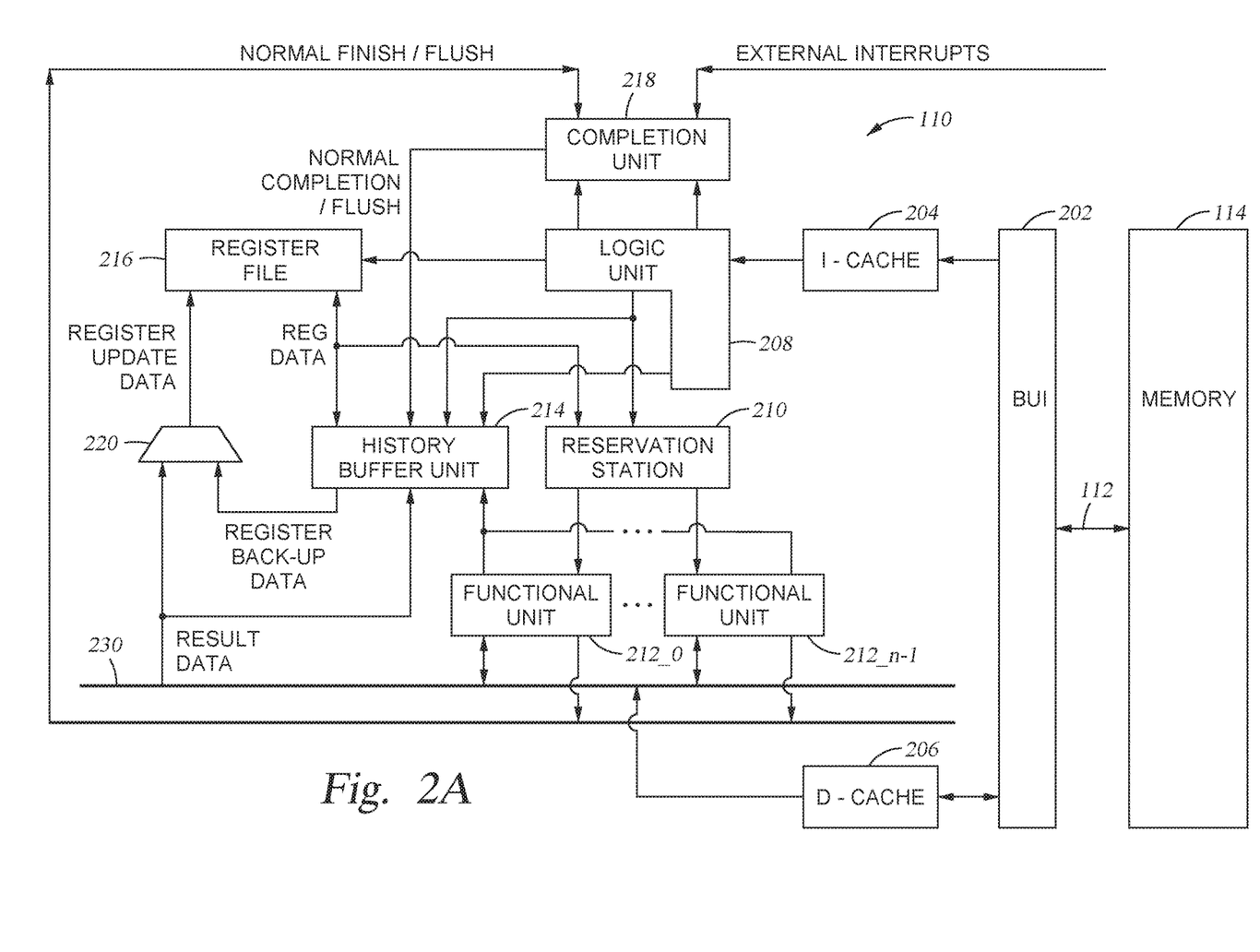
FIG. 2A illustrates a block diagram of a processor, according to one embodiment.

FIG. 2A illustrates a block diagram of a processor 110, according to one embodiments. The processor 110 has a bus interface unit 202 coupled to the bus 112 for controlling transfers of data and instructions between memory, such as random access memory 114, and caches, e.g. instruction cache (I-Cache) 204 and data cache (D-Cache) 206.

Instructions may be processed in the processor 110 in a sequence of logical, pipelined stages. However, it should be understood that the functions of these stages, may be merged together, so that this particular division of stages should not be taken as a limitation, unless such a limitation is indicated in the claims herein. Indeed, some of the previously described stages are indicated as a single logic unit 208 in FIG. 2A for the sake of simplicity of understanding and because each distinction between stages is not necessarily central to the present invention.

Logic unit 208 in FIG. 2A includes fetch, branch processing, instruction buffer, decode and dispatch units. The logic unit 208 fetches instructions from instruction cache 204 into the instruction buffer, either based on a normal sequence of the instructions or, in the case of a sequence having a conditional branch instruction, a predicted sequence. The predicted sequence may be in accordance with addresses selected by the branch processing unit. The logic unit 208 also decodes the instructions and dispatches them to an appropriate functional unit (e.g., execution unit) 212.0, 212.1, . . . 212.n-1 via reservation station 210. In executing the instructions, the units 212 input and output information to registers (shown collectively as register file 216). Register file 216 may include an array of processor registers (e.g., general purpose registers (GPRs), vector and scalar registers (VSRs), etc.). Register file 216 can include a number of RF entries or storage locations, each RF entry storing a 64 bit double word and control bits. In some cases, an RF entry may store 128 bit data. In one embodiment, register file 216 is accessed and indexed by logical register (LREG) identifiers, e.g., r0, r1, . . . , rn. Each RF entry holds the most recent (or youngest) fetched instruction and a corresponding ITAG. In one or more embodiments, each RF entry of the register file 216 is a mapping between ITAG entries and a corresponding ITAG. In some cases, each RF entry may also hold the most recent (or youngest) target result data corresponding to a LREG for providing the result data to a next operation. A new dispatch target replaces (or evicts) a current RF entry. In such cases, the current RF entry can be moved to the history buffer (HB) logic unit 214.

The functional units 212 signal the completion unit 218 upon execution of instructions and the completion unit 218 retires the instructions, which initializes the removal of entries corresponding to a pre-TM state from an external memory, e.g., memory 114, 116. As will be explained in detail later, a pre-TM state may be saved in an external memory, so that if an interrupt occurs, the pre-TM state may be recovered and restored within the content of registers.

Functional units 212 also assert results on one or more result buses (e.g. write back buses) 230 so that the results may be written by one or more write ports 220 to the registers in the register file 216. In addition to notifying the history buffer (HB) logic unit 214 about retired instructions, the completion unit 218 or logic unit 208 may also notify the HB logic unit 214 about exception conditions and mispredicted branches for which instructions should be discarded prior to completion and for which the HB logic unit 214 should recover a state of the processor 110 as will be further described below. The HB logic unit 214 may also receive other information about dispatched instructions from the logic unit 208, the register file 216, and one or more functional units 212.

In some embodiments, when a microprocessor (e.g., processor 110) is executing a speculative (new) TM instruction, all entries corresponding to the pre-TM state are saved. When the TM instruction has successfully completed (i.e., passed), these saved entries may be discarded. However, if the speculative transaction fails, all pre-TM registers are restored before execution may resume. In some cases, a TM mode may include executing a speculative transaction corresponding to a single processing thread. A speculative transaction typically includes a sequential block of software codes. In one embodiment, a transaction may be committed only if the transaction passes (e.g., does not conflict with other transactions corresponding to other threads). In some embodiments, a speculative transaction may be executed in a particular slice of a multi-slice processor. Also, two or more speculative transactions may be executed in parallel by two or more processing slices of the multi-slice processor, one transaction per slice. The transactions are speculative since the system does not know if the data generated by the transaction will actually result in an architected state or not. As noted above, if a transaction fails, the system may have to be restored back to the pre-TM state.

Figure 2B:
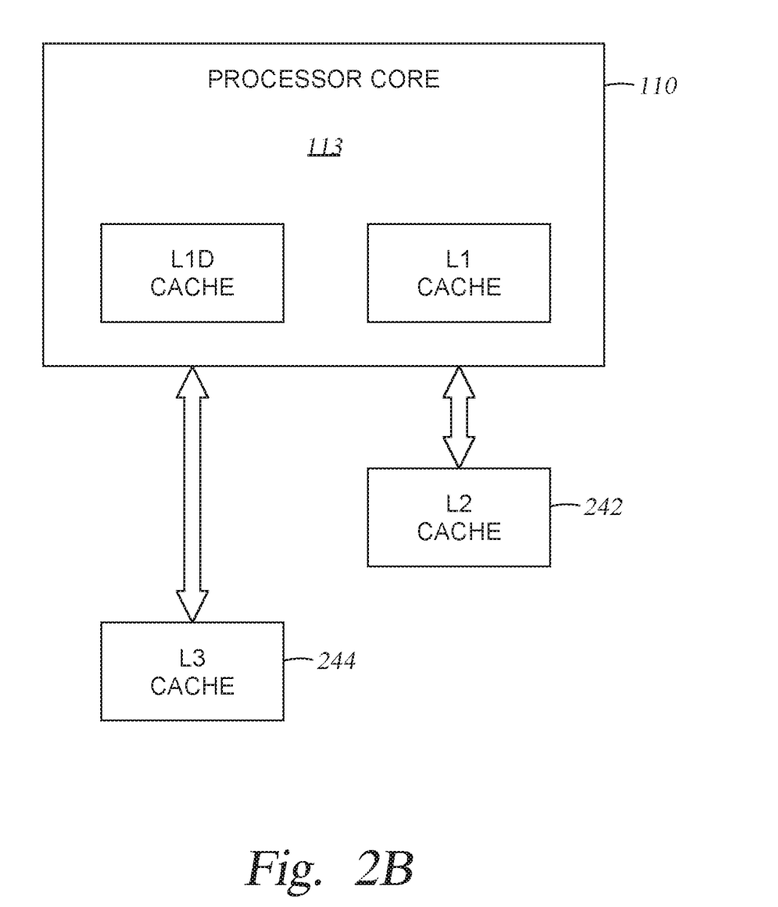
FIG. 2B illustrates a block diagram of a processing system, according to one embodiment.

In some cases, a pre-TM state (e.g. data values of registers evicted out by instructions in the TM mode) may be stored in a memory, e.g., memory 114, external to the processor 110, and restored when required. For example, as is shown in FIG. 2B, the pre-TM state may be stored in one or more of a L2 cache 242 or an L3 cache 244, both located outside the processor core 113 of the processor 110. In certain aspects, the TM mode may include speculative branch executions, rollbacks, and completions within the transaction of the TM mode, yielding speculative architected states of one or more registers that are true at least until the TM mode is running (i.e., the transaction is active). However, the speculative architected states of the registers may be rolled back to a pre-TM state once the TM mode is completed, e.g. TM mode fails or is aborted. Further, there may be one or more nested transactions within a transaction thread.

Figure 3:
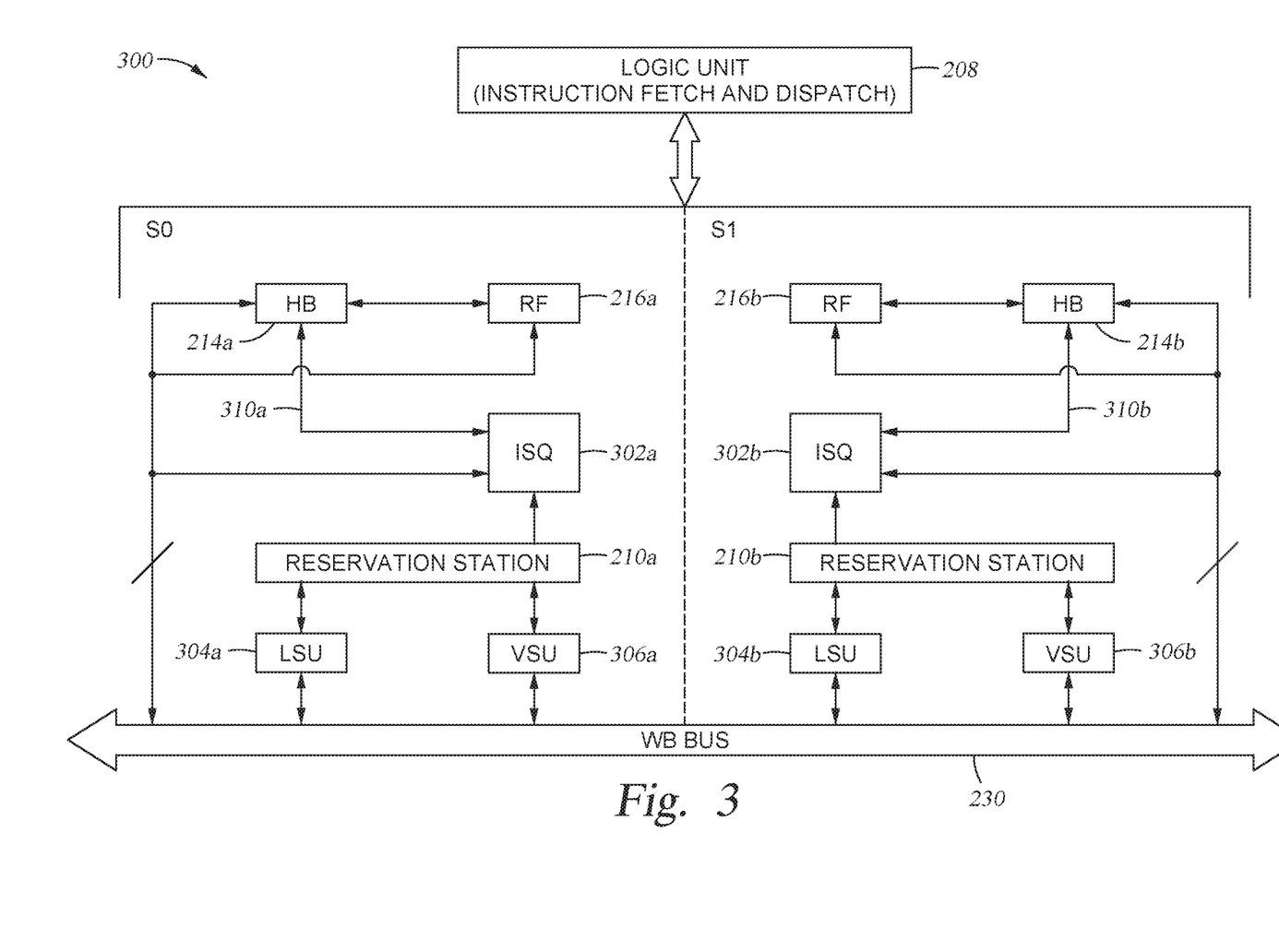
FIG. 3 illustrates a multi-slice processor, according to one embodiment.

In some embodiments, the processor 110 may have multiple execution/processing slices with each slice having one or more of the units shown in FIG. 3. For example, each processing slice may have its own logic unit 208, register file 216, HB logic unit 214, reservation station 210 and functional/execution units 212. The processor 110 having the multiple processing slices may be capable of executing multiple instructions simultaneously, for example, one instruction in each processing slice simultaneously in one processing cycle. Such a processor having multiple processing slices may be referred to as a multi-slice processor or a parallel-slice processor. Each processing slice may be an independent processor (e.g., processor 110) and may execute instructions independently of other processing slices in the multi-slice processor.

FIG. 3 illustrates a multi-slice processor 300, according to one embodiment. It may be noted that FIG. 3 only shows portions/components of the multi-slice processor 300 that are relevant for this discussion. As shown in FIG. 3, the multi-slice processor 300 includes two processing slices Slice 0 and Slice 1. Each of the Slices 0 and 1 includes an issue queue (ISQ) (302a and 302b), a reservation station (210a and 210b), execution units including a load store unit (LSU) (304a and 304b), a vector scalar unit (VSU) (306a and 306b), a register file (RF) (216a and 216b), and a history buffer (HB) unit (214a and 214b). As shown, logic unit 208 may perform instruction fetch and dispatch for the multi-slice processor. In one embodiment, the slices 0 and 1 may share one register file 216 having an array of GPRs and/or VSRs. In one embodiment, slices may share more than one register file 216, which is configured as a register bank. In one embodiment, slices 0 and 1 may use register file 216 and other components therein for register renaming.

The reservation station 210 may include a bank of register entries. The ISQ 302 can hold a set of instructions and the reservation station 210 can accumulate data for the instruction inputs. When an instruction is dispatched, the ISQ 302 may allocate an RF entry for the instruction. The source RF entries required as input for the instruction are looked up and passed on to the reservation station 210. When all source data accumulates for the instruction, the reservation station 210 passes it on to one or more execution units designated for executing the instruction. In an aspect, the reservation station 210 is part of the ISQ 302. Each of the LSUs 304 and VSUs 306 may make result data available on the write back buses 230 for writing into an RF entry or HB entry. In some embodiments, each of the LSUs 304 and VSUs 306 has a corresponding WB bus 230.

It may be noted that the two slices are shown for ease of illustration and discussion only, and that multi-slice processor 300 may include more than two slices with each slice having all the components discussed above for each of the slices 0 and 1. Further, the processing slices may be grouped into super slices (SS), with each super slice including a pair of processing slices. For example, a multi-slice processor may include two super slices SS0 and SS1, with SS0 including slices 0 and 1, and SS1 including slices 2 and 3. In some cases, one register file 216 may be allocated per super slice and shared by the processing slices of the super slice.

In some embodiments, the slices 0 and 1 of the multi-slice processor 300 simultaneously execute independent threads (e.g., one thread per slice) in a simultaneous multi-threading mode (SMT). Thus, multiple threads may be simultaneously executed by the multi-slice processor 300. In an aspect, a super slice acts as a thread boundary. For example, in a multi thread mode, threads T0 and T1 may execute in SS0 and threads T2 and T3 may execute in SS1. Further, in a single thread (ST) mode, instructions associated with a single thread may be executed simultaneously by the multiple processing slices of at least one super slice, for example, one instruction per slice simultaneously in one processing cycle. The simultaneous processing in the multiple slices may considerably increase processing speed of the multi-slice processor 300.

As noted above, the HB logic unit 214 may save a processor state before, for example, an instruction indicating start of a speculative transaction, so that if the speculative transaction fails, HB control logic may recover the processor state prior to the start of the speculative transaction by restoring the content of registers. In one embodiment, the pre-TM state stored within the HB logic unit 214 may be stored within memory 114 illustrated in FIG. 2A.

Generally, the HB logic unit 214a and HB logic unit 214b independently perform completion and/or flush operations of the pre-TM state stored within the memory 114. When an instruction finishes executing, it may be considered completed and is retired. Completion of an instruction indicates that there may be no further exceptions requiring restore (such that depositing the results of the instruction will not violate the program order), and the state of the processor (e.g., defined by one or more RF entries) becomes the architected state. Thus, an RF entry stored in the memory 114 may be flushed or removed. In an aspect, the pre-TM state stored within the memory 114 remains valid until its evictor completes. To determine whether an instruction in is complete, the HB logic unit 214a and the HB logic unit 214b may independently compare the completion ITAG to the evictor ITAG in each entry. The completion ITAG may be broadcasted by the completion unit 218 upon a decision that an instruction corresponding to the entry ITAG is complete.

Figure 4:
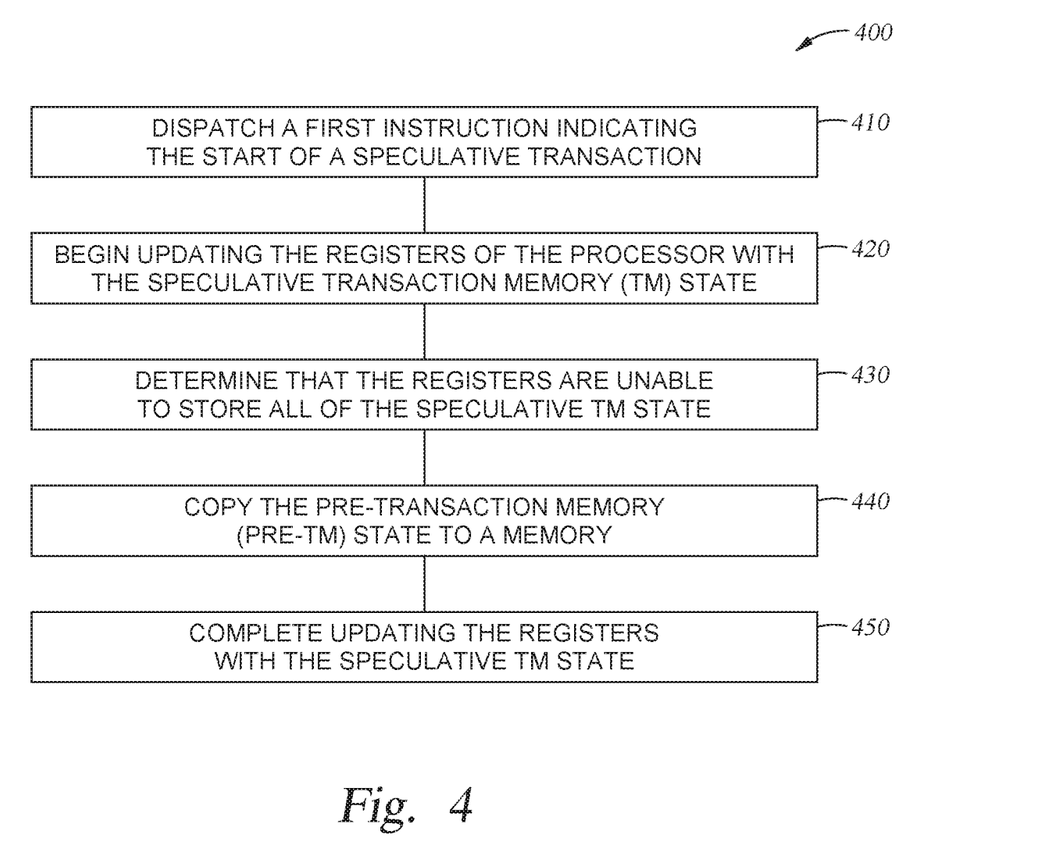
FIG. 4 illustrates a method for storing a pre-transaction memory state to a memory, according to one or more embodiments.

FIG. 4 illustrates a method 400 for storing a pre-TM state to a memory external of a processor, according to one or more embodiments. At step 410, the logic unit 208 dispatches a first instruction (e.g., Tbegin) indicating the start of a speculative transaction. In one embodiment, the first instruction indicates a start of a speculative transaction in the processor 110. Once the first instruction is dispatched, the processor 110 can mark all LREGs in the register file with a pre-TM bit to indicate that the LREGs have been dispatched before the speculative transaction.

At step 420, the HB logic unit 214 begins updating the registers of the processor with the speculative TM state. For example, the speculative TM state may be placed within available registers of register file 216. The available registers within register file 216 may correspond to those registers that are free from pre-TM state data. At step 430, the HB logic unit 214 determines that the registers, register file 216, are unable to store the entire speculative TM state by detecting that there are not enough available registers to store the entirety of the speculative TM state. For example, the HB logic unit 214 may determine that to store all of the speculative TM state within the registers, one or more registers of the register file 216 comprising pre-TM state data must be overwritten. In response to the determination that the registers are unable to store all of the speculative TM state, the HB logic unit 214 copies the pre-TM to a memory (step 440). For example, the HB logic unit 214 may copy the pre-TM state to an L2 cache 242, an L3 cache 244, or any other memory external to the processor 110. After the pre-TM state has been copied to the memory, updating the register file 216 with the speculative TM state may be completed (step 450).

Figure 5:
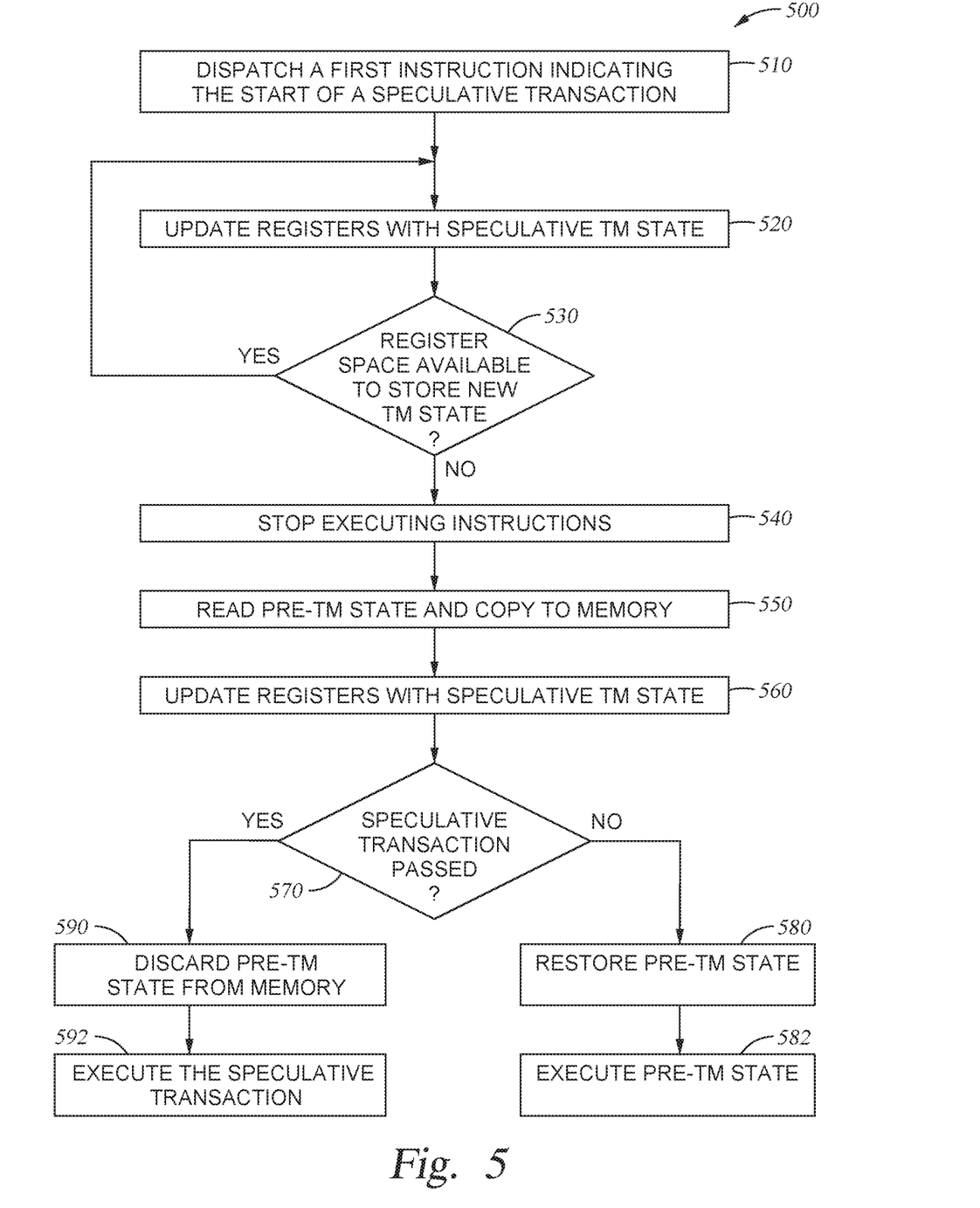
FIG. 5 illustrates a method for storing and restoring a pre-transaction memory state to and from a memory, according to one or more embodiments.

FIG. 5 illustrates a method 500 for storing and restoring a pre-TM state from a memory external to a processor, according to one or more embodiments. At step 510, the logic unit 208 dispatches a first instruction (e.g., Tbegin) indicating the start of a speculative transaction. In one embodiment, the first instruction indicates a start of a speculative transaction in the processor 110. Once the first instruction is dispatched, the processor 110 can mark all registers in the register file 216 with a pre-TM bit. For example, the logic unit 208 may identify all of the registers of the register file 216 containing a pre-TM state and mark those registers with a pre-TM bit. At step 520, HB logic unit 214 updates the registers of the processor 110. For example, the register file 216 may be updated with speculative TM state. However, as some of the registers of the register file 216 may comprise data corresponding to the pre-TM state, there may not be enough registers within the register file 216 to store all of the speculative TM state. Further, as the pre-TM state is used to recover from a possible failure, those registers cannot be overwritten without first backing up the pre-TM state. At step 530, the HB logic unit 214 determines whether or not there are enough registers available to store the speculative TM state is made. For example, the HB logic unit 214 may detect that that there are not enough available registers to store the remaining entries of the speculative TM state. Further, the HB logic unit 214 may detect that there are enough available registers with the register file 216 to store the entirety of the speculative TM state. Additionally, in response to a determination that there are available registers within the register file 216 that may be used to store the speculative TM state, updating of those registers continues.

In response to a determination that the there are no and/or not enough available registers in the register file 216 to store the remaining entries of the register file 216, the processor 110 stops executing the program running on the processor 110 (step 540). To stop executing the program, the logic unit 208 may trigger an interrupt. The interrupt may be a millicode interrupt which instructs the processor 110 to complete a set of hardware instructions to move the pre-TM state from the RF file 216 to a memory external (e.g., memory 114) to the processor 110. The millicode interrupt may instruct the processor 110 to process one thread at a time while moving the pre-TM state. The processor 110 may perform a lookup function to identify each of the pre-TM state entries in the register file 216 and HB logic unit 214, and then provide the pre-TM register to the millicode interrupt instruction requesting a particular LREG. The millicode instruction executes with this pre-TM register data and moves each identified pre-TM state entry to the memory 114.

At step 550, the HB logic unit 214 reads and copies the pre-TM state to the memory. The processor 110 may copy the pre-TM state from the register file 216 to memory 114. For example, the HB logic unit 214 may copy the pre-TM state to the L2 cache 242 or the L3 cache 244. After each of the pre-TM state registers have been moved to the memory 114, the interrupt may be ended and the logic unit 208 may continue updating the registers in the register file 216 with the speculative TM state (e.g., step 560).

At step 570, the logic unit 208 make the determination whether or not the speculative transaction has passed is made.

At step 580, the logic unit 208 determines that the speculative transaction failed to pass and pre-TM state is to be restored back to the register file 216. In one embodiment, to restore the pre-TM state that has been moved to a memory (e.g., memory 114); the logic unit 208 may trigger an interrupt. The interrupt may be a millicode interrupt which instructs the processor 110 to complete a set of hardware instructions to move the pre-TM state from the memory external to the processor 110 back to the register file 216. At step 582, the transaction corresponding to the pre-TM state is executed.

At step 590, the logic unit 208 may instruct the HB logic unit 214 to flush or remove the pre-TM state from the memory 114 in response to a determination that the speculative transaction has passed. For example, the HB logic unit 214 may instruct the memory 114 to flush the pre-TM state. At step 592, the speculative transaction is executed.

Figure 6:
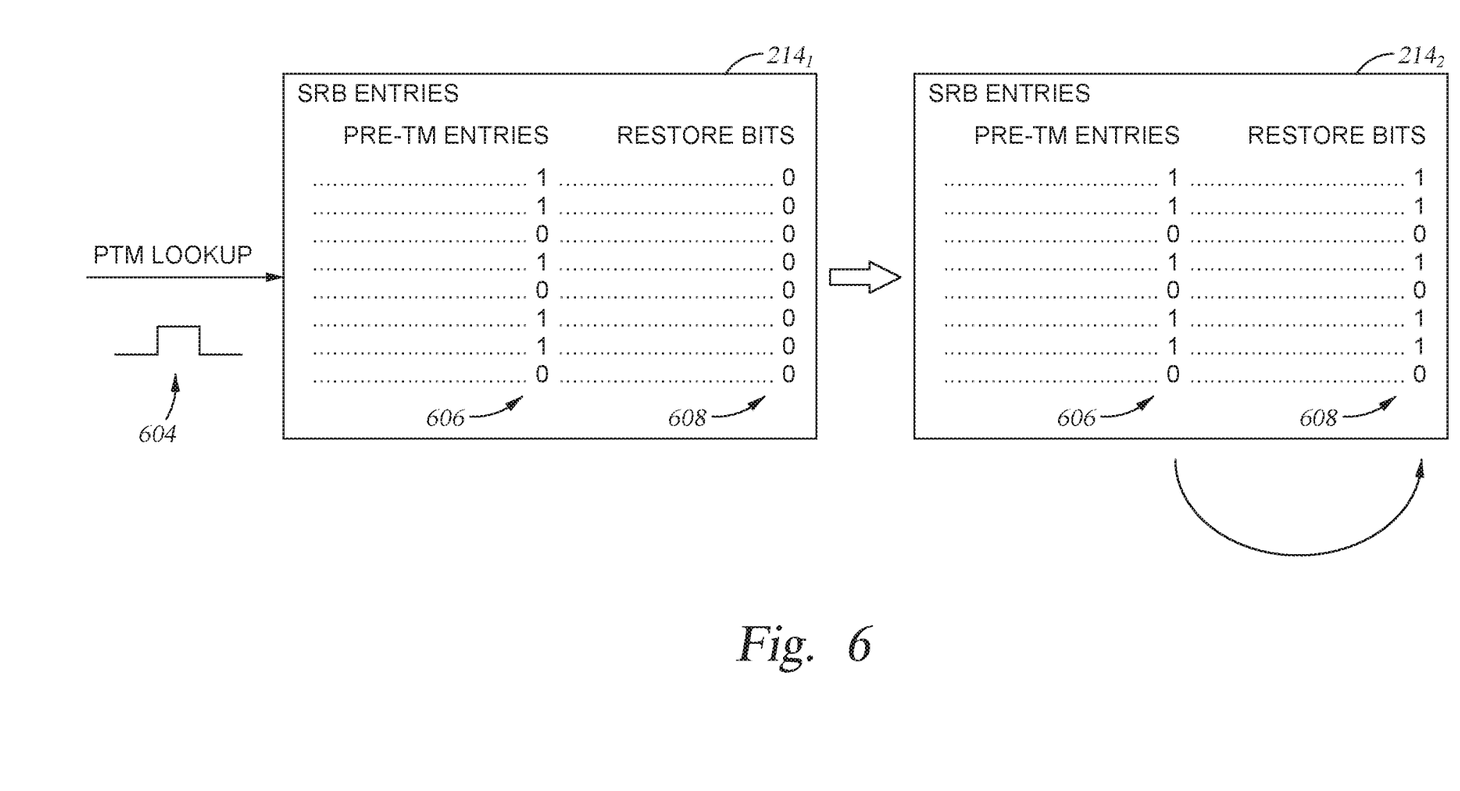
FIG. 6 illustrates a history buffer unit, according to one or more embodiments.

FIG. 6 illustrates an example of instructing the HB logic unit 214 to readout the pre-TM entries to be stored within a memory (e.g., memory 114), according to one or more embodiments. The HB logic unit 214 receives a pre-TM look-up signal 604 that instructs the HB logic unit 214 to read-out the pre-TM state entries 606. Each HB logic unit entry with a pre-TM bit sets the restore bit 608. For example, HB logic unit 214₁ illustrates the HB logic unit 214 before the restore bits 605 have been set by the pre-TM state entries 606. Further, HB logic unit 214₂ illustrates the HB logic unit 214 after the restore bits 605 have been set by the pre-TM state entries 606. The pre-TM look-up signal 604 instructs the HB logic unit 214 to use the flush-restore interface of the HB logic unit 214 to provide pre-TM data to the ISQ 302 and then to the memory 114. The pre-TM state entries 606 set "restore" bits 608 to indicate which particular entries are to be read from the HB logic unit 214 and provided to the ISQ 302 to move the indicated entries from the HB logic unit 214 to the memory 114.

Figure 7:
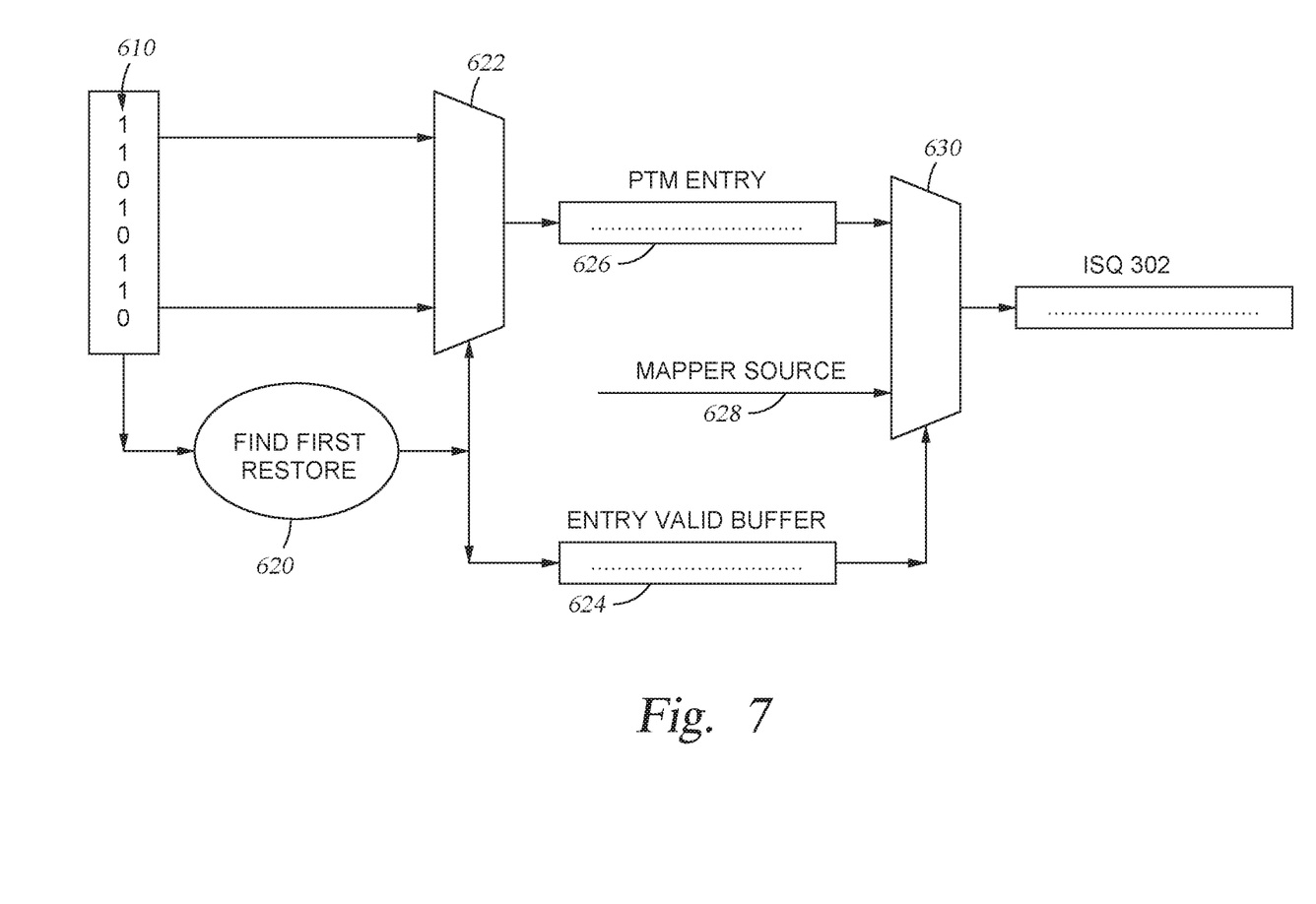
FIG. 7 illustrates an interface between a history buffer and an issue queue, according to one or more embodiments.

FIG. 7 illustrates the interface between HB logic unit 214 and ISQ 302, according to one or more embodiments. The HB logic unit 214 may be configured to read entries out of the memory 114 through the flush-restore interface of the HB logic unit 214. In various embodiments, the flush-restore interface may be configured to communicate with the register file 216 and the ISQ 302. In such embodiments, the HB logic unit 214 provides pre-TM data to the instruction in of the ISQ 302 via the flush-restore interface.

Restore bits 610 correspond to the pre-TM state entries stored within HB logic unit 214. The find first restore state machine 620 examines the restore bits 610 to detect which entries should be restored. For example, the find first restore state machine 620 may be set to determine that an entry is to be read when the restore-bit has a value of 1. Further, the find first restore state machine 620 may provide an indication to multiplexer 622 as to which restore bits to select for restoring and which ones to ignore. The output of the find first restore state machine 620 is also provided to the entry valid buffer 624. This buffer indicates that a pre-TM entry was found in the HB logic unit 214 and is available to be moved to an external memory. The pre-TM buffer 626 is generated from the output of the multiplexer 622 and selects the pre-TM entry to be read. The output of the pre-TM buffer 626, the output of the entry valid buffer 624 and the mapper source 628 from the register file 216 are provided to multiplexer 630. The multiplexer 630 selects either the mapper source 628 data or the pre-TM buffer 626 data to be output to the ISQ 302. The mapper source data may be provided from the register file 216. The entry valid buffer 624 may be employed as a select signal to control the multiplexer 630. For example, the entry valid buffer 624 may instruct the multiplexer to select the pre-TM entry whenever there is a valid pre-TM entry. A valid pre-TM entry is provided to the ISQ 302 to execute with the millicode instruction.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for storing a speculative transaction memory (TM) state within a register file (RF) of a processor, the method comprising:
   receiving a first instruction indicating a start of a speculative transaction;
   begin updating the RF with the speculative TM state, wherein the speculative TM state corresponds to the speculative transaction;
   determining that the RF is unable to store the speculative TM state;
   copying a previous TM (pre-TM) state from the RF to a memory external to the processor in response to determining that the RF is unable to store the speculative TM state; and
   complete updating the RF with the speculative TM state.

2. The method of claim 1 further comprising triggering an interrupt to stop updating the RF with the speculative TM state in response to determining that the RF is unable to store the speculative TM state.

3. The method of claim 2 further comprising identifying, after triggering the interrupt, registers of the RF corresponding to the pre-TM state.

4. The method of claim 2, wherein the interrupt instructs the processor to stop executing a program running on the processor.

5. The method of claim 1 further comprising:
   discarding the pre-TM state from the memory in response to determining that the speculative transaction has passed; and
   executing the speculative transaction.

6. The method of claim 1 further comprising:
   restoring the pre-TM state from the memory to the RF in response to determining failure of the speculative transaction.

7. The method of claim 6, wherein restoring the pre-TM state from the memory to the RF comprises:
   identifying pre-TM state entries stored within the memory; and
   copying the pre-TM state entries to the RF.

8. A processor communicatively coupled with a memory, the processor comprising:
   a register file (RF) comprising a plurality of registers;
   a logic unit configured to generate an instruction indicating a start of a speculative transaction; and
   a history buffer logic unit configured to:
      begin updating the RF with a speculative transaction memory (TM) state in response to the instruction, wherein the speculative TM state corresponds to the speculative transaction,
      determine that the RF is unable to store the speculative TM state,
      copy a pre-TM state from the RF to the memory in response to determining that the RF is unable to store the speculative TM state, and
      complete updating the RF with the speculative TM state.

9. The processor of claim 8 wherein the logic unit is further configured to trigger an interrupt to stop updating the RF with the speculative TM state in response to determining that the RF is unable to store the speculative TM state.

10. The processor of claim 9, wherein the history buffer unit is further configured to identify, after triggering the interrupt, one or more of the plurality of registers of the RF that correspond to the pre-TM state.

11. The processor of claim 9, wherein the interrupt instructs the processor to stop executing a program.

12. The processor of claim 8, wherein the history buffer unit is further configured to:
    discard the pre-TM state from the memory in response to determining that the speculative transaction has passed.

13. The processor of claim 8, wherein the history buffer unit is further configured to:
    restore the pre-TM state from the memory to the RF in response to determining failure of the speculative transaction.

14. The processor of claim 13, wherein restoring the pre-TM state from the memory to the RF comprises:
    identifying pre-TM state entries stored within the memory; and
    copying the pre-TM state entries to the RF.

15. A system, comprising:
    a memory; and
    a processor communicatively coupled with the memory, the processor comprising
       a register file (RF) comprising a plurality of registers, wherein the processor is configured to:
          begin updating the RF with a speculative transaction memory (TM) state in response to an instruction, wherein the speculative TM state corresponding to a speculative transaction;
          determine that the RF is unable to store all of the speculative TM state;
          copy a previous TM (pre-TM) state from the RF to the memory in response to determining that the RF is unable to store the speculative TM state; and
          complete updating the RF with the speculative TM state.

16. The system of claim 15, wherein the processor is further configured to trigger an interrupt to stop updating the RF with the speculative TM state in response to determining that the RF is unable to store the speculative TM state.

17. The system of claim 16, wherein the processor is further configured to identify, after triggering the interrupt, one or more of the plurality of registers of the RF that correspond to the pre-TM state.

18. The system of claim 15, wherein the processor is further configured to:
    discard the pre-TM state from the memory in response to determining that the speculative transaction has passed; and
    execute the speculative transaction.

19. The system of claim 15, wherein the processor is further configured to:
    restore the pre-TM state from the memory to the RF in response to determining failure of the speculative transaction.

20. The system of claim 19, wherein restoring the pre-TM state from the memory to the RF comprises:
    identifying pre-TM state entries stored within the memory; and
    copying the pre-TM state entries to the RF.

* * * * *